(12) United States Patent
Liu

(10) Patent No.: US 11,597,513 B2
(45) Date of Patent: Mar. 7, 2023

(54) MULTI-ROTOR UNMANNED AERIAL VEHICLE

(71) Applicant: SZ DJI TECHNOLOGY CO., LTD., Shenzhen (CN)

(72) Inventor: Yifen Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 724 days.

(21) Appl. No.: 16/452,521

(22) Filed: Jun. 25, 2019

(65) Prior Publication Data

US 2020/0031467 A1 Jan. 30, 2020

Related U.S. Application Data

(63) Continuation of application No. PCT/CN2016/112273, filed on Dec. 27, 2016.

(51) Int. Cl.
*B64C 39/02* (2006.01)
*B64C 27/41* (2006.01)

(52) U.S. Cl.
CPC ............ *B64C 39/024* (2013.01); *B64C 27/41* (2013.01); *B64C 2201/027* (2013.01)

(58) Field of Classification Search
None
See application file for complete search history.

(56) References Cited

U.S. PATENT DOCUMENTS

| 2013/0105635 A1* | 5/2013 | Alzu'bi | B64C 39/024 244/23 A |
| 2013/0206915 A1* | 8/2013 | Desaulniers | B64C 29/00 244/165 |

(Continued)

FOREIGN PATENT DOCUMENTS

| CA | 2888144 A1 | 4/2014 |
| CN | 85200335 U | 11/1985 |

(Continued)

OTHER PUBLICATIONS

World Intellectual Property Organization (WIPO) International Search Report for PCT/CN2016/112273 dated Oct. 10, 2017 5 pages.

(Continued)

*Primary Examiner* — Timothy D Collins
*Assistant Examiner* — Justin Michael Heston
(74) *Attorney, Agent, or Firm* — Anova Law Group, PLLC

(57) ABSTRACT

A multi-rotor unmanned aerial vehicle (UAV) comprises: a fuselage; a plurality of rotor mechanisms disposed on the fuselage, each rotor mechanism including a rotor; and a plurality of connection mechanisms disposed on the fuselage. The plurality of connection mechanisms have a one-to-one correspondence with the plurality of rotor mechanisms, each connection mechanism corresponding to one of the plurality of rotor mechanisms. Each rotor mechanism is movably connected to the fuselage through the corresponding connection mechanism; and the plurality of rotor mechanisms are configured to be rotated with respect to the corresponding connection mechanisms to cause the plurality of rotor mechanisms to overlap with each other and form a rotor mechanism assembly.

21 Claims, 15 Drawing Sheets

(56) References Cited

U.S. PATENT DOCUMENTS

| | | | |
|---|---|---|---|
| 2014/0034776 A1* | 2/2014 | Hutson | F16M 11/18 244/17.17 |
| 2014/0061362 A1* | 3/2014 | Olm | B64C 39/005 244/2 |
| 2015/0321755 A1 | 11/2015 | Martin | |
| 2016/0340021 A1 | 11/2016 | Gong et al. | |
| 2017/0073065 A1* | 3/2017 | Von Novak | B64C 39/024 |
| 2017/0369162 A1* | 12/2017 | Alzahrani | B64C 39/024 |
| 2018/0178896 A1* | 6/2018 | Lee | B64C 39/024 |
| 2020/0079495 A1* | 3/2020 | Yang | B64C 1/16 |

FOREIGN PATENT DOCUMENTS

| | | |
|---|---|---|
| CN | 2078283 U | 6/1991 |
| CN | 201432768 Y | 3/2010 |
| CN | 104590556 A | 5/2015 |
| CN | 105035317 A | 11/2015 |
| CN | 204956909 U | 1/2016 |
| CN | 105539821 A | 5/2016 |
| CN | 205256650 U | 5/2016 |
| CN | 205345315 U | 6/2016 |
| CN | 105857571 A | 8/2016 |
| CN | 205499328 U | 8/2016 |
| CN | 106005778 A | 10/2016 |
| DE | 102005014949 A1 | 10/2006 |
| KR | 101456035 B1 | 11/2014 |
| KR | 101589263 B1 | 1/2016 |
| KR | 20160119988 A | 10/2016 |
| WO | 2016068383 A1 | 5/2016 |

OTHER PUBLICATIONS

Machine Translation of CN104590556A. Accessed on Oct. 23, 2019.

Machine Translation of CN105035317A. Accessed on Oct. 23, 2019.

Machine Translation of CN204956909U. Accessed on Oct. 23, 2019.

Machine Translation of CN205345315U. Accessed on Oct. 23, 2019.

Machine Translation of KR101589263B1. Accessed on Oct. 23, 2019.

Machine Translation of WO2016068383A1. Accessed on Oct. 23, 2019.

* cited by examiner

MULTI-ROTOR UNMANNED AERIAL VEHICLE

CROSS-REFERENCE TO RELATED APPLICATION

This application is a continuation application of International Application No. PCT/CN2016/112273, titled "Multi-Rotor Unmanned Aerial Vehicle", filed on Dec. 27, 2016, the entire contents of which are incorporated herein by reference.

TECHNICAL FIELD

The present disclosure relates to the technical field of unmanned aerial vehicles (UAVs), in particular to a multi-rotor UAV.

BACKGROUND

Existing multi-rotor UAVs are generally configured with protective covers on their rotors. Due to the relatively large sizes of the protective cover, a multi-rotor UAV may be inconvenient to carry.

At present, a small number of quadrotor UAVs are designed in a foldable form and are more convenient for a user to carry. However, only the two side rotors may be foldable in these quadrotor UAVs. Therefore, although it is more convenient to carry these quadrotor UAVs compared to the non-foldable ones, the problem of the large size of the UAV is still unsolved.

SUMMARY

In one aspect of the present disclosure, a multi-rotor unmanned aerial vehicle (UAV) is provided. The multi-rotor UAV comprises: a fuselage; a plurality of rotor mechanisms disposed on the fuselage, each rotor mechanism including a rotor; and a plurality of connection mechanisms disposed on the fuselage. The plurality of connection mechanisms have a one-to-one correspondence with the plurality of rotor mechanisms, each connection mechanism corresponding to one of the plurality of rotor mechanisms. Each rotor mechanism is movably connected to the fuselage through the corresponding connection mechanism; and the plurality of rotor mechanisms are configured to be rotated with respect to the corresponding connection mechanisms to cause the plurality of rotor mechanisms to overlap with each other and form a rotor mechanism assembly.

In certain embodiments, for each connection mechanism of the multi-rotor UAV, the connection mechanism includes a first connection assembly movably coupled to the fuselage; the first connection assembly is connected to the corresponding rotor mechanism and configured to be rotated about a first axial line of the first connection assembly; and the first axial line is inclined at a preconfigured angle from a yaw axis of the multi-rotor UAV.

In certain embodiments, for each connection mechanism of the multi-rotor UAV, the first connection assembly includes a first rotating shaft connected to the fuselage along the first axial line and a first connection base pivotally connected to the first rotating shaft and coupled to the corresponding rotor mechanism.

In certain embodiments of the multi-rotor UAV, the plurality of rotor mechanisms are an even number of rotor mechanisms.

In certain embodiments of the multi-rotor UAV, the even number of rotor mechanisms constitute a plurality of rotor mechanism sets, each rotor mechanism set including two of the plurality of rotor mechanisms; and for each rotor mechanism set, after the two rotor mechanisms of the rotor mechanism set are rotated with respect to their corresponding connection mechanisms, the two rotor mechanisms are symmetrically arranged on two sides of the fuselage.

In certain embodiments, the multi-rotor UAV is a hexrotor UAV having six rotor mechanisms constituting a first rotor mechanism set, a second rotor mechanism set, and a third rotor mechanism set; for each of the two rotor mechanisms in the first rotor mechanism set, the first axial line of the corresponding connection forms a 90° angle with the yaw axis of the multi-rotor UAV; and for each of the four rotor mechanisms in the second and third rotor mechanism sets, the first axial line of the corresponding connection mechanism forms an acute angle with the yaw axis of the multi-rotor UAV.

In certain embodiments of the multi-rotor UAV, the acute angle is in the range of 35° to 85°.

In certain embodiments of the multi-rotor UAV, for each connection mechanism, the connection mechanism includes a second connection assembly movably coupled to the fuselage and a third connection assembly movably coupled to the second connection assembly; the second connection assembly is configured to be rotated about a second axial line, the second axial line being inclined at an angle from a yaw axis of the multi-rotor UAV; and the third connection assembly is connected to the rotor mechanism corresponding to the connection mechanism and is configured to be rotated about a third axial line.

In certain embodiments of the multi-rotor UAV, for each connection mechanism, the second connection assembly includes a second rotating shaft fixed to the fuselage along the second axial line and a second connection base pivotally connected to the second rotating shaft; the third connection assembly includes a first connection body fixed to the second connection base and a second connection body movably connected to the first connection body along the third axial line; and the second connection body is connected to the rotor mechanism and configured to be rotated with respect to the first connection body about the third axial line.

In certain embodiments of the multi-rotor UAV, the second axial line is perpendicular to the third axial line.

In certain embodiments of the multi-rotor UAV, the plurality of rotor mechanisms are an odd number of rotor mechanisms; the odd number of rotor mechanisms include a main rotor mechanism and an even number of auxiliary rotor mechanisms; and the main rotor mechanism and the auxiliary rotor mechanisms are configured to be rotated with respect to their corresponding connection mechanisms to form a rotor mechanism assembly.

In certain embodiments of the multi-rotor UAV, after the even number of auxiliary rotor mechanisms are rotated with respect to their corresponding connection mechanisms, they are symmetrically arranged on two sides of the main rotor mechanism, and form the rotor mechanism assembly with the main rotor mechanism.

In certain embodiments of the multi-rotor UAV, the multi-rotor UAV is a trirotor UAV having three rotor mechanisms; for the main rotor mechanism, the second axial line of the corresponding connection mechanism forms a 9o° angle with the yaw axis of the multi-rotor UAV; and for each of the two auxiliary rotor mechanisms, the second axial line of the corresponding connection mechanism forms an acute angle with the yaw axis of the multi-rotor UAV. In certain embodiments of the multi-rotor UAV, the acute angle is in the range of 35° to 85°.

In certain embodiments of the multi-rotor UAV, the even number of auxiliary rotor mechanisms constitute a plurality of auxiliary rotor mechanism sets, each auxiliary rotor mechanism set including two of the plurality of auxiliary rotor mechanisms; and for each auxiliary rotor mechanism set, the two auxiliary rotor mechanisms are symmetrically arranged on two sides of the main rotor mechanism after being rotated with respect to their corresponding connection mechanisms.

In certain embodiments of the multi-rotor UAV, the multi-rotor UAV is a pentarotor UAV having five rotor mechanisms, the five rotor mechanisms constituting the main rotor mechanism, a first auxiliary rotor mechanism set having two of the auxiliary rotor mechanisms, and a second auxiliary rotor mechanism set having another two of the auxiliary rotor mechanisms; for each of the two auxiliary rotor mechanisms in the first auxiliary rotor mechanism set, the second axial line of the corresponding connection mechanism is inclined at a first acute angle with respect to the yaw axis of the multi-rotor UAV; for each of the two auxiliary rotor mechanisms in the second auxiliary rotor mechanism set, the second axial line of the corresponding connection mechanism is inclined at a second acute angle with respect to the yaw axis of the multi-rotor UAV; and for the main rotor mechanism, the second axial line of the corresponding connection mechanism forms a 90o angle with the yaw axis of the multi-rotor UAV.

In certain embodiments of the multi-rotor UAV, the first acute angle is in the range of 35o to 85o; and the second acute angle is in the range of 35° to 85°.

In certain embodiments of the multi-rotor UAV, each connection mechanism comprises a rotation mechanism disposed on the fuselage, the rotation mechanism being coupled to the corresponding rotor mechanism for driving the rotor mechanism to rotate.

In certain embodiments of the multi-rotor UAV, the rotation mechanism is a universal joint mechanism.

In certain embodiments of the multi-rotor UAV, the plurality of rotor mechanisms are configured to be overlapped with each other to form a concentric rotor mechanism assembly.

In certain embodiments of the multi-rotor UAV, each rotor mechanism further includes a protective cover disposed outside the rotor; and the plurality of rotor mechanisms are configured to be overlapped with each other to form a concentric rotor mechanism assembly.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are only some embodiments of the present disclosure. Other drawings may be obtained by those of ordinary skill in the art based on these drawings.

FIG. 9 illustrates another step of the folding process of the quadrotor UAV shown in

FIG. 7.

DETAILED DESCRIPTION

Figure 1:
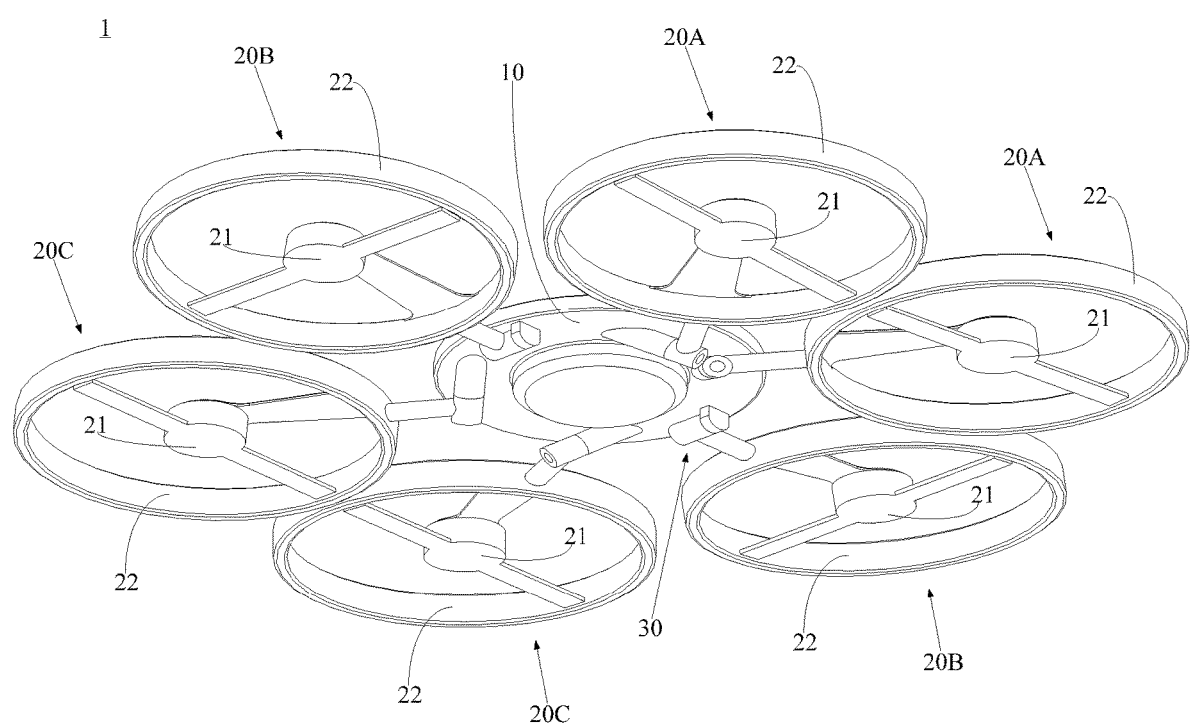
FIG. 1 is a perspective view of a hexrotor UAV according to an embodiment of the present disclosure.

The technical solutions according to the embodiments of the present disclosure described in the following with reference to the accompanying drawings. The described embodiments are only part of the embodiments of the present disclosure, but not all the embodiments. All other embodiments obtained by a person of ordinary skill in the art based on the embodiments of the present disclosure without creative efforts are within the scope of the present disclosure.

Exemplary embodiments will be described in detail herein. These embodiments are illustrated in the accompanying drawings. In the following description, unless otherwise indicated, same or similar referral numerals may refer to the same or similar elements in different drawings. The implementation manners described in the following exemplary embodiments do not represent all embodiments of the present disclosure. Instead, they are merely examples of devices and methods consistent with aspects provided by the present disclosure as detailed in the claims.

The technical terms used in the present disclosure are for the purpose of describing particular embodiments, and are not intended to limit the present disclosure. Unless otherwise indicated in the context, the singular forms of "a", "said", and "the" are also meant to include plural forms. It should also be understood that the term "and/or" as used herein refers to and encompasses any and all possible combinations of one or more of the associated listed items.

The multi-rotor UAV provided by the present disclosure will be described in detail below with reference to the accompanying drawings. The features of the embodiments described below may be combined with each other when there is no conflict.

A multi-rotor UAV according to an embodiment of the present disclosure includes a fuselage and a plurality of rotor mechanisms disposed on the fuselage. Each rotor mechanism includes a rotor. The multi-rotor UAV further includes a plurality of connection mechanisms disposed on the fuselage. The number of the connection mechanisms is the same as the number of the rotor mechanism, and the connections mechanisms have a one-to-one correspondence with the rotor mechanisms, each connection mechanism corresponding to a rotor mechanism. Each rotor mechanism may be movably coupled to the fuselage through its corresponding connection mechanism. The plurality of rotor mechanisms may be rotated with respect to their corresponding connection mechanisms, and may be overlapped with each other to form a rotor mechanism assembly.

In the multi-rotor UAV provided by the present disclosure, each rotor mechanism is movably connected to the fuselage through its corresponding connection mechanism. After the plurality of rotor mechanisms have been rotated with respect to the corresponding connection mechanisms, the rotor mechanisms may overlap with each other to form a rotor mechanism assembly, thereby making the multi-rotor foldable and portable. Further, since the plurality of rotor mechanisms may be overlapped with each other to form a rotor mechanism assembly, the volume of the multi-rotor UAV may be significantly reduced.

The connection mechanisms of the multi-rotor UAV may be implemented with at least in the following three implementation manners, so that the rotor mechanisms are movably connected to the connection mechanisms, and the plurality of rotor mechanisms can be rotated with respect to the corresponding connection mechanisms, and can be overlapped with each other to form the rotor mechanism assembly.

In the first implementation manner, each rotor mechanism may be rotated with respect to the fuselage with a fixed angle through the connection mechanism, so that the plurality of rotor mechanisms may be rotated with respect to the corresponding connection mechanisms in a preconfigured order to achieve foldability, and being overlapped with each other to form the rotor mechanism assembly.

Referring to FIGS. 1-9, in the first implementation manner, a multi-rotor UAV 1 provided by the present disclosure includes a fuselage 10 and a plurality of rotor mechanisms 20 disposed on the fuselage 10. The plurality of rotor mechanisms 20 may include mechanisms 20A, 20B, 20C, 20D, and 20E as shown in the drawings. Each rotor mechanism 20 includes a rotor 21. The multi-rotor UAV 1 further includes a plurality of connection mechanisms 30 disposed on the fuselage 10. The number of the connection mechanisms 30 is the same as the number of the rotor mechanisms 20. The plurality of connection mechanisms 30 have a one-to-one correspondence with the plurality of rotor mechanisms 20, each connection mechanism 30 corresponding to a rotor mechanism 20. Each rotor mechanism 20 may be movably connected to the fuselage 10 through its corresponding connection mechanism 30. The plurality of rotor mechanisms 20 may be rotated with respect to their corresponding connection mechanisms 30, and may be overlapped with each other to form the rotor mechanism assembly 2.

In an embodiment of the present disclosure, each rotor mechanism 20 includes a protective cover 22 disposed outside the rotor 21. Optionally, the plurality of rotor mechanisms 20 may be overlapped with each other to form a concentric rotor mechanism assembly 2. Further, the protective cover 22 may have a circular shape, and the rotor mechanism assembly 2 may have a cylindrical shape.

Figure 2:
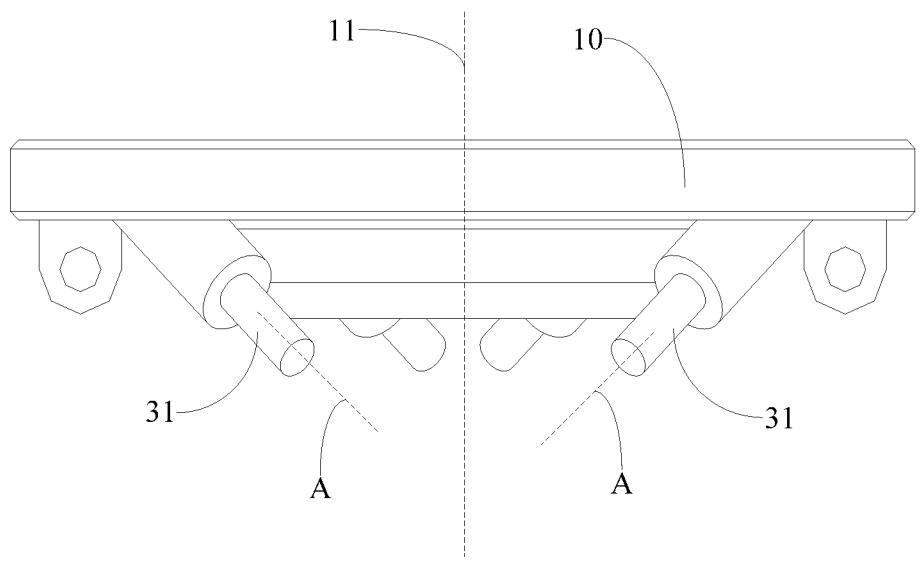
FIG. 2 is a projection view of the fuselage of the hexrotor UAV shown in FIG. 1.
Figure 3:
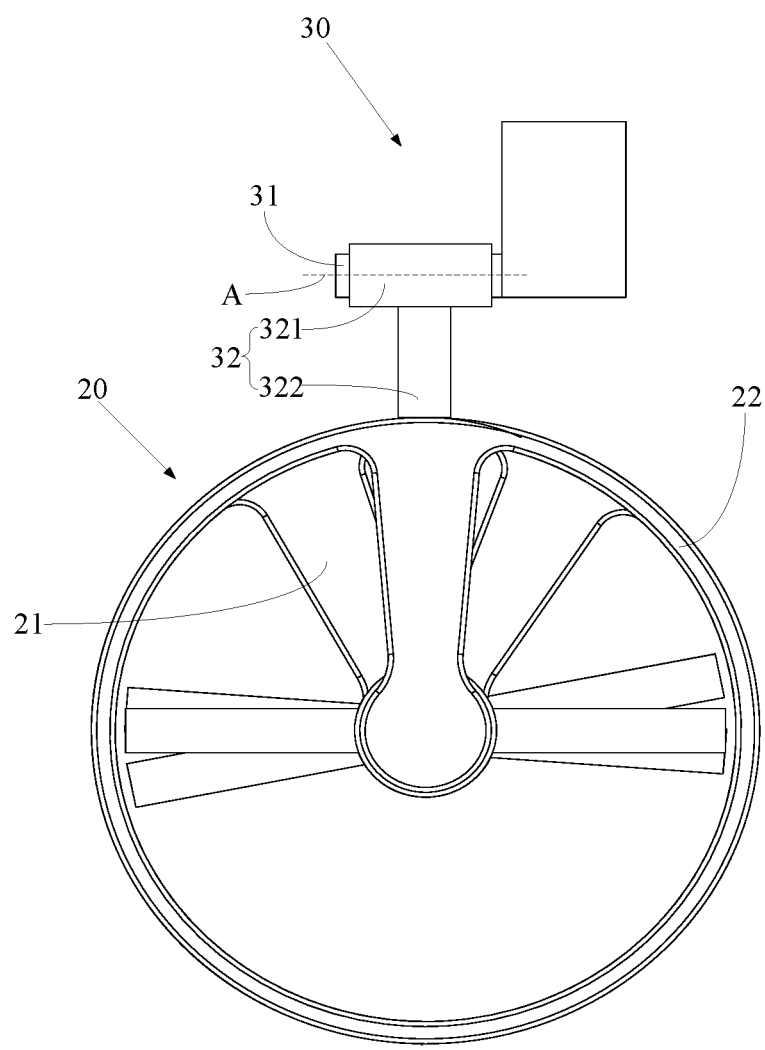
FIG. 3 is a projection view of the hexrotor UAV shown in FIG. 1 after being folded.

In an embodiment of the present disclosure, as shown in FIGS. 2 and 3, each connection mechanism 30 includes a first connection assembly movably coupled to the fuselage 10. The first connection assembly is connected to the rotor mechanism 20 and may be rotated about a first axial line A. The first axial line A may be inclined at a preconfigured angle from a yaw axis 11 of the multi-rotor UAV 1. Optionally, the first connection assembly may include a first rotating shaft 31 fixed to the fuselage 10 along the first axial line A and a first connection base 32 pivotally connected to the first rotating shaft 31. The first connection base 32 may be coupled to the rotor mechanism 20. Optionally, the first connection base 32 may include a connection base body 321 pivotally connected to the first rotating shaft 31 and a connection member 322 pivotally connected to the connection base body 321 along an axis perpendicular to the first axial line A. The connection member 322 may be coupled to the rotor mechanism 20.

In an embodiment of the present disclosure, the number of the rotor mechanisms 20 is an even number. After each rotor mechanisms 20 has been rotated with respect to its corresponding connection mechanism 30, the plurality of rotor mechanisms 20 together form a rotor mechanism assembly 2. Optionally, the even number of the rotor mechanisms 20 may constitute a plurality of rotor mechanism sets, each rotor mechanism set including two rotor mechanisms 20. The two rotor mechanisms 20 of each rotor mechanism set may be symmetrically arranged on the two sides of the fuselage 10 after having been rotated with respect to their corresponding connection mechanisms 30.

In the example shown in FIGS. 1-6, the multi-rotor UAV 1 is a hexrotor UAV having six rotor mechanisms. As shown in FIG. 1, two rotor mechanisms 20A constitute a first rotor mechanism set. Two rotor mechanisms 20B constitute a second rotor mechanism set. And two rotor mechanisms 20C constitute a third rotor mechanism set. A preconfigured angle formed between an axial line of the first rotating shaft 31 of the connection mechanism 30 corresponding to each of the two rotor mechanisms 20B in the second rotor mechanism set and the yaw axis 11 of the multi-rotor UAV 1 is 90°. A preconfigured angle formed between the axial line of the first rotating shaft 31 of the connection mechanism 30 corresponding to each of the four rotor mechanisms 20A and 20C of the other rotor mechanism sets and the yaw axis 11 of the multi-rotor UAV 1 is an acute angle. Optionally, the preconfigured acute angle may be within the range of 35° to 85°.

Figure 4:
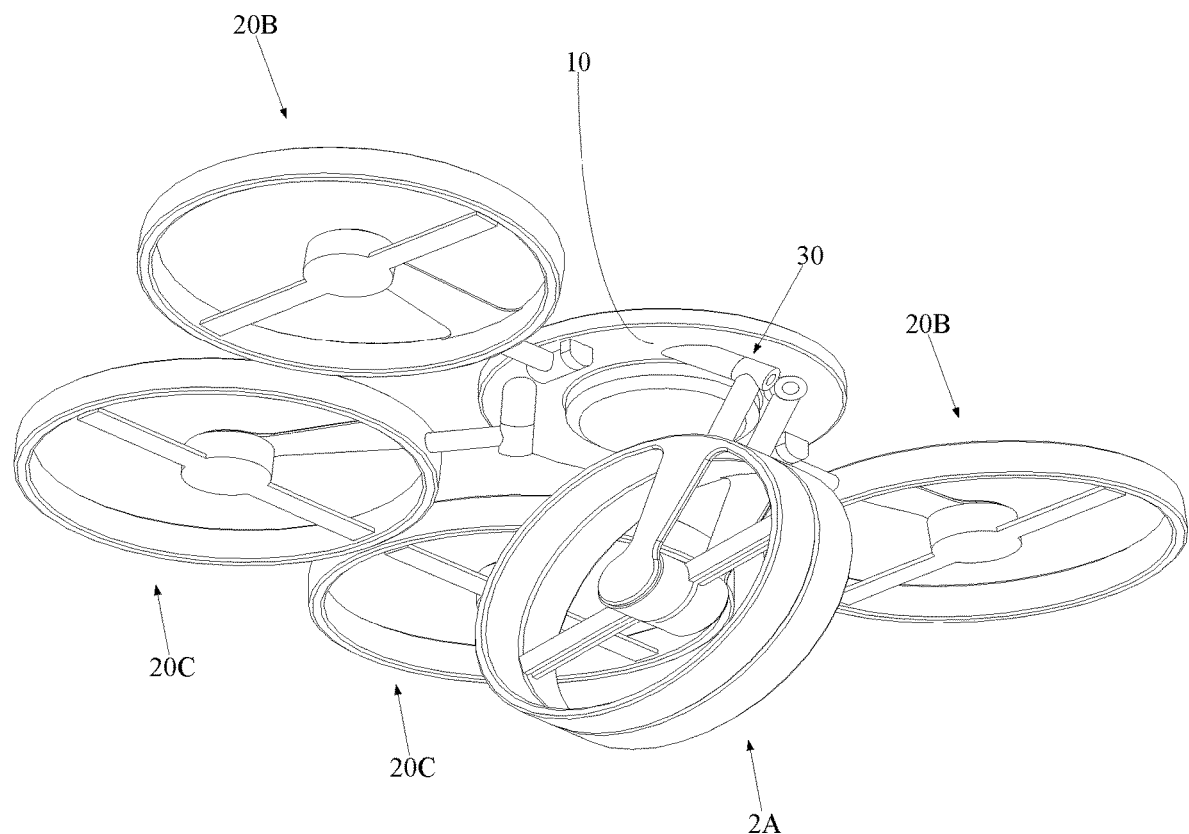
FIG. 4 illustrates a step of a folding process of the hexrotor UAV shown in FIG. 1.
Figure 5:
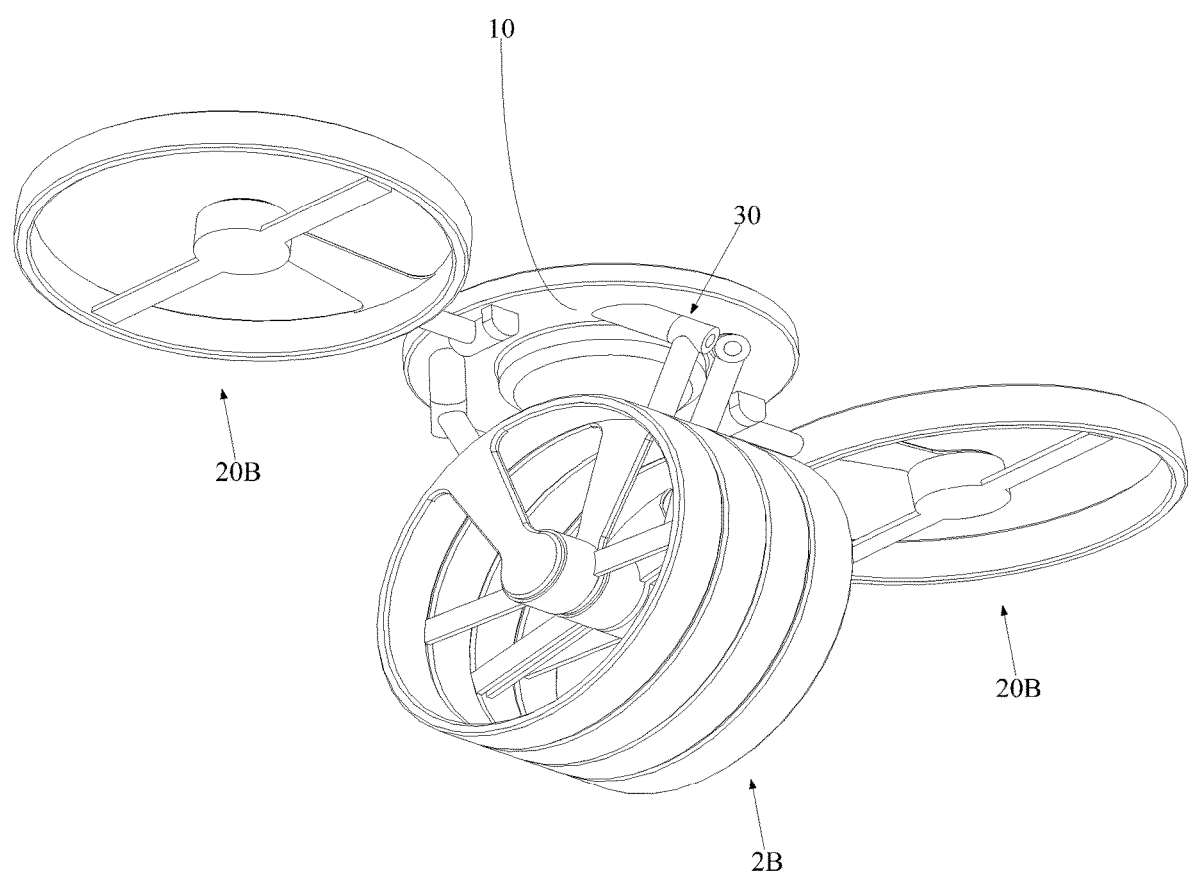
FIG. 5 illustrates another step of the folding process of the hexrotor UAV shown in FIG. 1.
Figure 6:
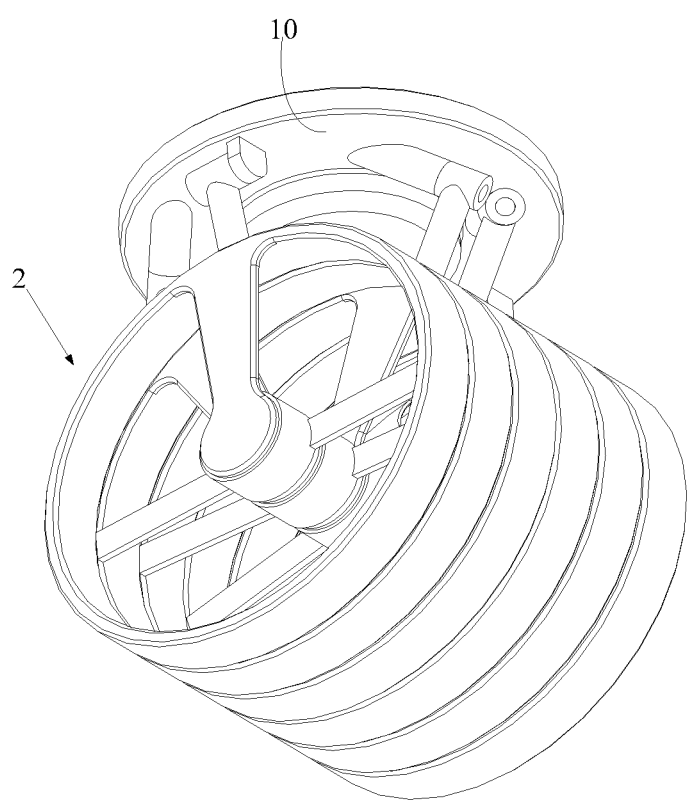
FIG. 6 illustrates another step of the folding process of the hexrotor UAV shown in FIG. 1.

When the hexrotor UAV is being folded, first, the first connection base 32 of the connection mechanism 30 corresponding to each of the two rotor mechanisms 20A of the first rotor mechanism set is rotated about the first axial line A with respect to the first rotating shaft 31, thereby driving the two rotor mechanisms 20A of the first rotor mechanism set to rotate and overlap with each other to form a first rotor mechanism assembly 2A, as shown in FIG. 4. Next, the first connection base 32 of the connection mechanism 30 corresponding to each of the two rotor mechanisms 20C of the third rotor mechanism set is rotated about the first axial line A with respect to the first rotating shaft 31, thereby driving the two rotor mechanisms 20C of the third rotor mechanism set to rotate and overlap with the first rotor mechanism assembly 2A to form a second rotor mechanism assembly 2B, as shown in FIG. 5. Finally, the first connection base 32 of the connection mechanism 30 corresponding to each of the two rotor mechanisms 20B of the second rotor mechanism set is rotated with respect to the first rotating shaft 31 about the first axial line A, thereby driving the two rotor mechanisms 20B of the second rotor mechanism set to rotate and overlap with the second rotor mechanism assembly 2B to form a rotor mechanism assembly 2, and completing the folding of the hexrotor UAV, as shown in FIG. 6.

Figure 7:
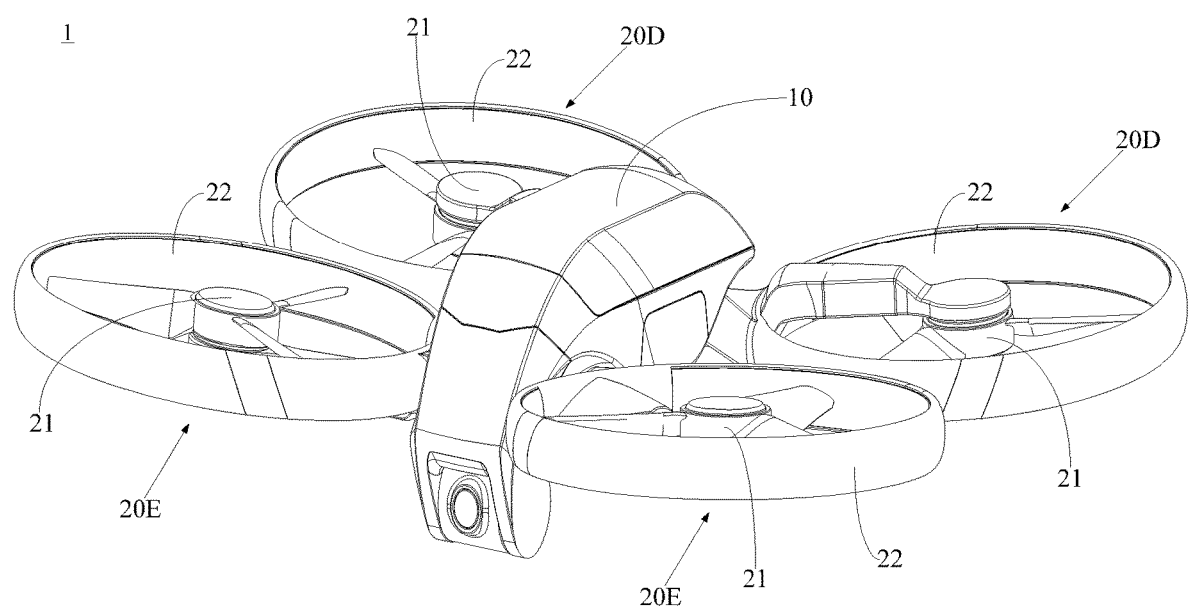
FIG. 7 is a perspective view of a quadrotor UAV according to an embodiment of the present disclosure.
Figure 8:
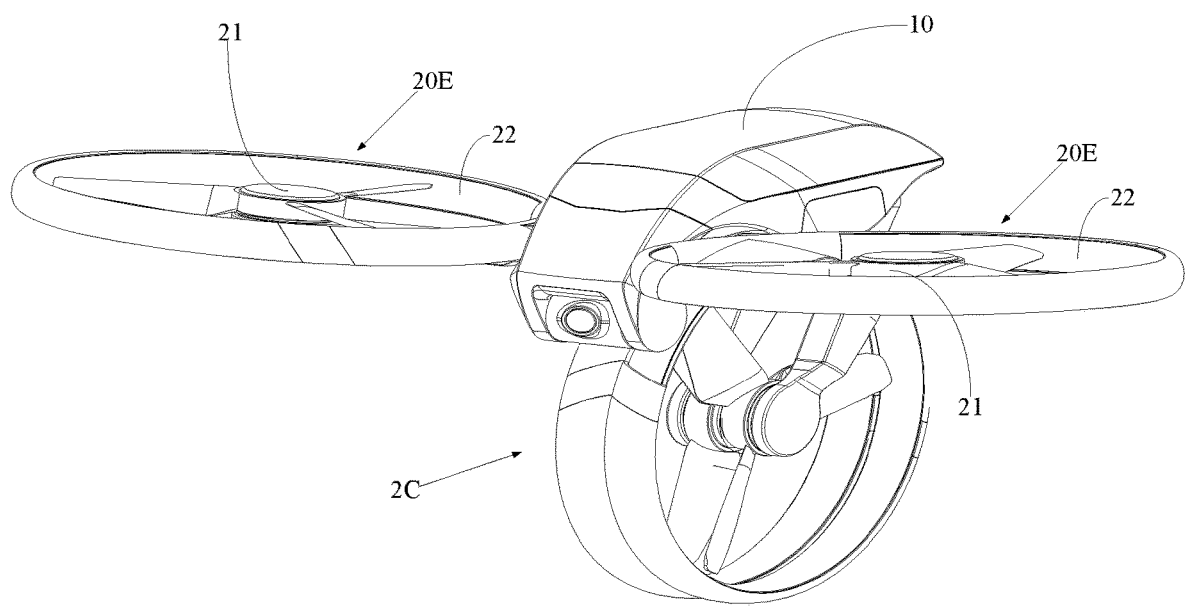
FIG. 8 illustrates a step of a folding process of the quadrotor UAV shown in FIG. 7.
Figure 9:
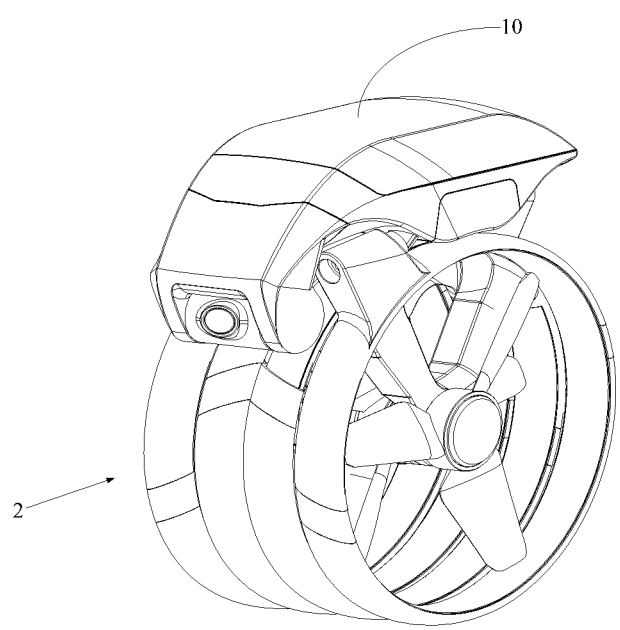

In the example shown in FIGS. 7-9, the multi-rotor UAV 1 is a quadrotor UAV having four rotor mechanisms. As shown in FIG. 7, two rotor mechanisms 20D form a first rotor mechanism set and two rotor mechanisms 20E form a second rotor mechanism set. A preconfigured angle formed between the axial line of the first rotating shaft 31 of the connection mechanism 30 corresponding to each of the four rotor mechanisms 20D and 20E and the yaw axis 11 of the multi-rotor UAV 1 is an acute angle. Optionally, the preconfigured acute angle is in the range of 35° to 85°.

When the quadrotor UAV is being folded, first, the first connection base 32 of the connection mechanism 30 corresponding to each of the two rotor mechanisms 20D of the first rotor mechanism set is rotated about the first axial line A with respect to first rotating shaft 31, thereby driving the two rotor mechanisms 20D of the first rotor mechanism set to rotate and overlap with each other to form a third rotor mechanism assembly 2C, as shown in FIG. 8. Next, the first connection base 32 of the connection mechanism 30 corresponding to each of the two rotor mechanisms 20E of the second rotor mechanism set is rotated with respect to the first rotating shaft 31 about the first axial line A, thereby driving the two rotor mechanisms 20E of the second rotor mechanism set to rotate and overlap with the third rotor mechanism assembly 2C to form a rotor mechanism assembly 2, and completing the folding of the quadrotor UAV, as shown in FIG. 9.

In another example provided by the present disclosure, the multi-rotor UAV is a bi-rotor UAV having two rotor mechanisms. A preconfigured angle formed between the axial line of the first rotating shaft of the connection mechanism corresponding to each of the two rotor mechanisms and the yaw axis of the multi-rotor UAV is 90°. When the bi-rotor UAV is being folded, the first connection base of the connection mechanism corresponding to each of the two rotor mechanisms is directly rotated about the first axial line with respect to the first rotating shaft, thereby driving the two rotor mechanisms to rotate and overlap with each other to form a rotor mechanism assembly, and completing the folding of is the bi-rotor UAV.

In the second implementation manner, each rotor mechanism may first be rotated with a fixed inclination angle through the corresponding connection mechanism, and may then be rotated with respect to the corresponding connection mechanism, so that the plurality of rotor mechanisms may be rotated with respect to the corresponding connection mechanisms in a preconfigured order to achieve foldability of the multi-rotor UAV, and be overlapped with each other to form a rotor mechanism assembly.

Referring to FIGS. 10-15, in the second implementation manner, a multi-rotor UAV 1 provided by the present disclosure includes a fuselage 10 and a plurality of rotor mechanisms 20 disposed on the fuselage 10. The plurality of rotor mechanisms 20 may include rotor mechanisms 20F and 20G as shown in the drawings. Each of the rotor mechanisms 20 includes a rotor 21. The multi-rotor UAV further includes a plurality of connection mechanisms 30 disposed on the fuselage 10. The number of the connection mechanisms 30 is the same as the number of the rotor mechanisms 20. The plurality of connection mechanisms 30 have a one-to-one correspondence with the plurality of the mechanisms 20, each connection mechanism 30 corresponding to a rotor mechanism. Each rotor mechanism 20 is movably coupled to the fuselage 10 through its corresponding connection mechanism 30. The plurality of rotor mechanisms 20 are rotated with respect to their corresponding connection mechanisms 30, and can be overlapped with each other to form a rotor mechanism assembly 2.

Figure 11:
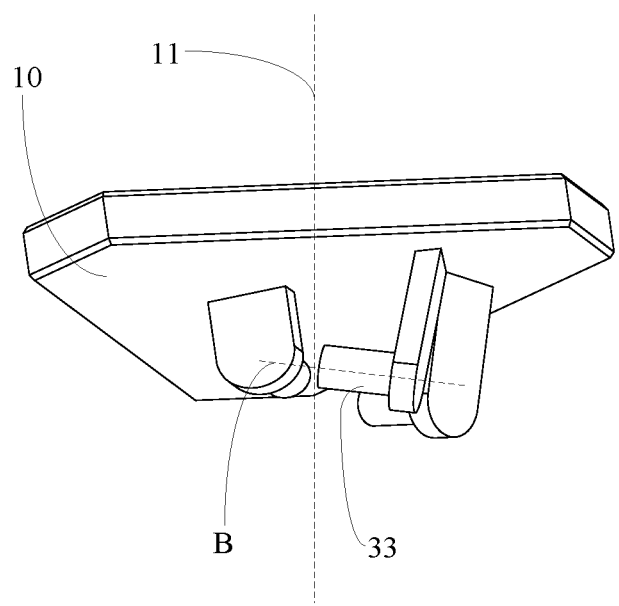
FIG. 11 is a projection view of the fuselage of the trirotor UAV shown in FIG. 10.
Figure 12:
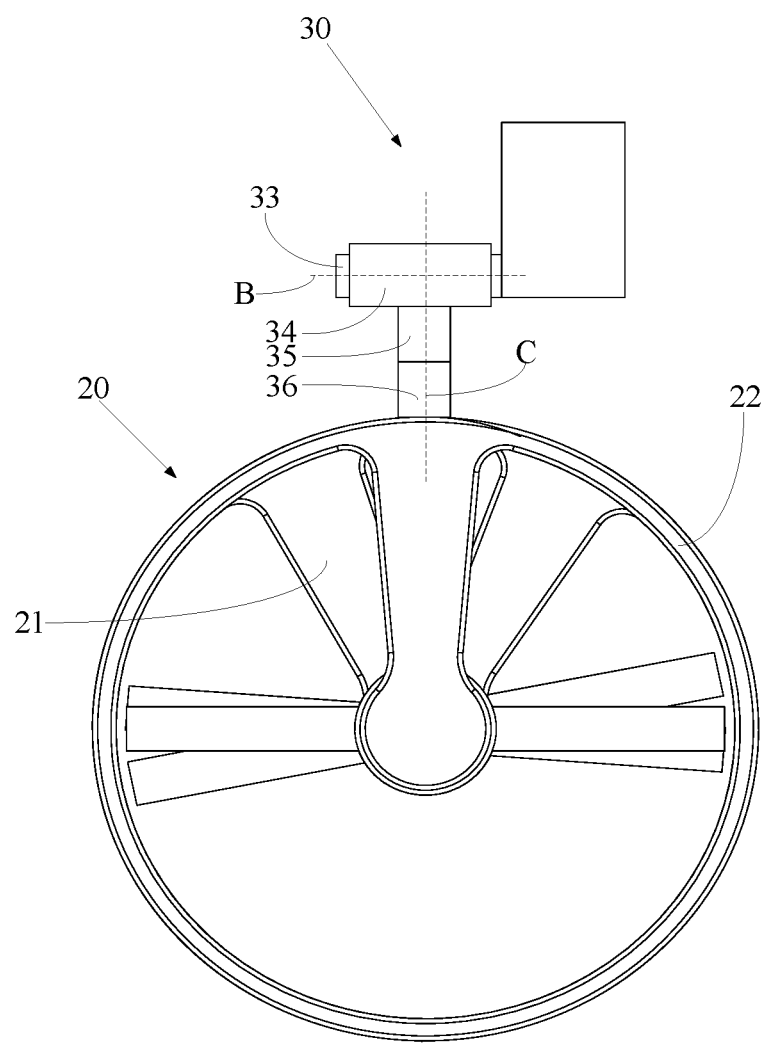
FIG. 12 is a projection view of the trirotor UAV shown in FIG. 10 after being folded.

In an embodiment of the present disclosure, as shown in FIG. 11 and FIG. 12, the connection mechanism 30 may include a second connection assembly movably coupled to the fuselage 10 and a third connection assembly movably coupled to the second connection assembly. The second connection assembly is rotatable about a second axial line B. The second axial line B may be inclined at a preconfigured angle with respect to the yaw axis 11 of the multi-rotor UAV 1. The third connection assembly is coupled to the rotor mechanism 20 and is rotatable along a third axial line C.

Optionally, the second connection assembly may include a second rotating shaft 33 fixed to the fuselage 10 along the second axial line B and a second connection base 34 pivotally connected to the second rotating shaft 33. The third connection assembly may include a first connection body 35 fixed to the second connection base 34 and a second connection body 36 movably connected to the first connection body 35 along the third axial line C. The second connection body 36 is coupled to the rotor mechanism 20 and may be rotatable with respect to the first connection body 35 along the third axial line C. Further, the second axial line B may be perpendicular to the third axial line C.

In an embodiment of the present disclosure, the number of the rotor mechanisms 20 is an odd number, and the plurality of rotor mechanisms 20 include a main rotor mechanism and an even number of auxiliary rotor mechanisms. The main rotor mechanism and the even number of the auxiliary rotor mechanisms may be rotated with respect to the corresponding connection mechanisms 30 to form a rotor mechanism assembly 2 together. Optionally, after the even number of the auxiliary rotor mechanisms are rotated with respect to the corresponding connection mechanisms 30, they are symmetrically disposed on two sides of the main rotor mechanism, forming the rotor mechanism assembly 2 with the main rotor mechanism.

Figure 10:
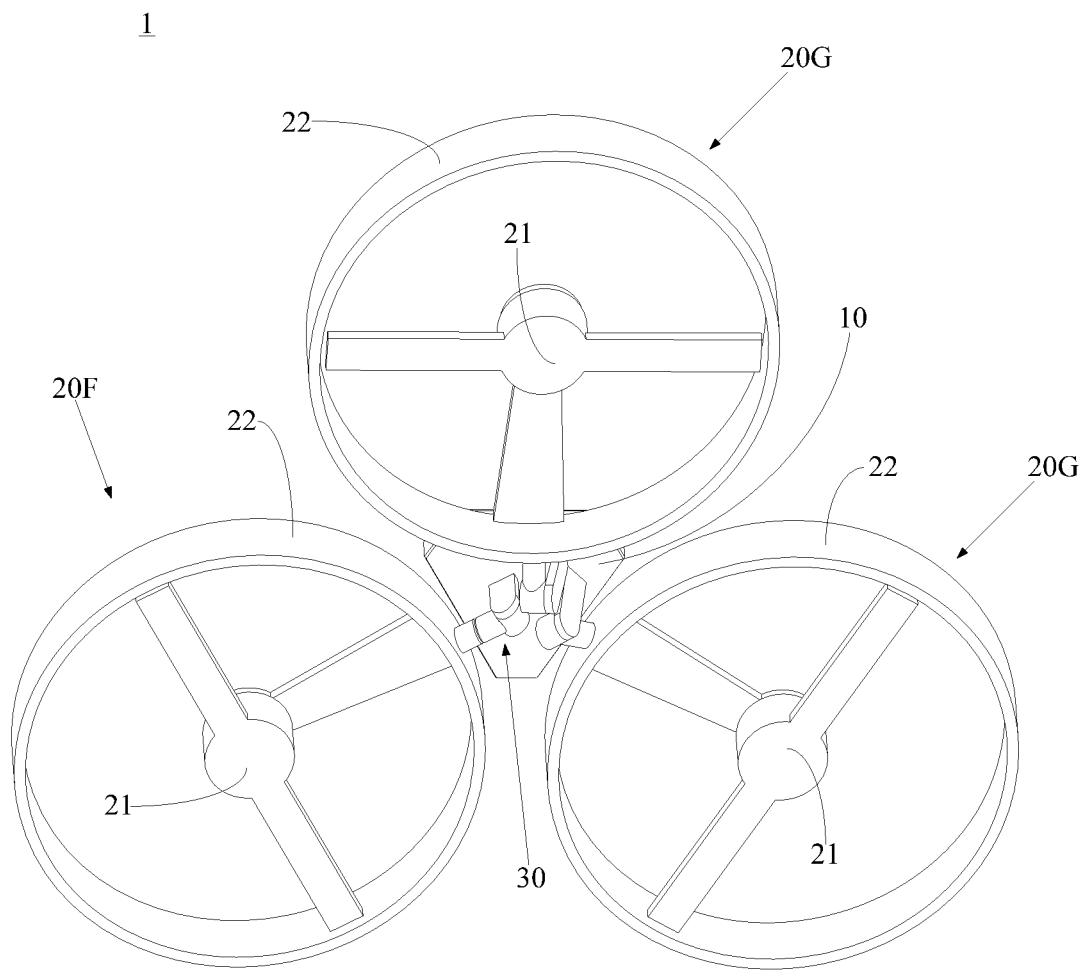
FIG. 10 is a perspective view of a trirotor UAV according to an embodiment of the present disclosure.

In the example shown in FIGS. 10-15, the multi-rotor UAV 1 is a trirotor UAV having three rotor mechanisms. As shown in FIG. 10, the rotor mechanism 20F is a main rotor mechanism, and the two rotor mechanisms 20G are auxiliary rotor mechanisms. A preconfigured angle formed between the axial line of the second rotating shaft 33 of the connection mechanism 30 corresponding to the main rotor mechanism 20F and the yaw axis 11 of the multi-rotor UAV 1 is 90°. A preconfigured angle formed between the axial line of the second rotating shaft 33 of the connection mechanism 30 corresponding to each of the two auxiliary rotor mechanisms 20G and the yaw axis 11 of the multi-rotor UAV 1 is an acute angle. Optionally, the preconfigured acute angle may be in the range of 35° to 85°.

Figure 13:
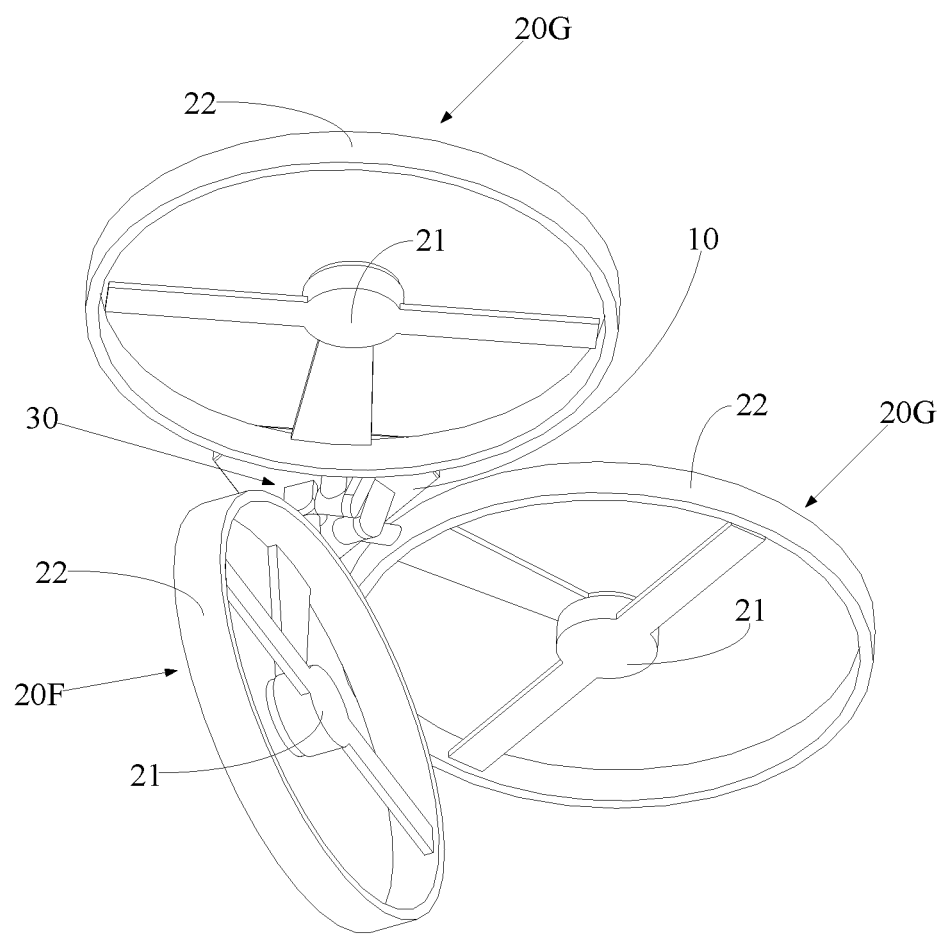
FIG. 13 illustrates a step of a folding process of the trirotor UAV shown in FIG. 10.
Figure 14:
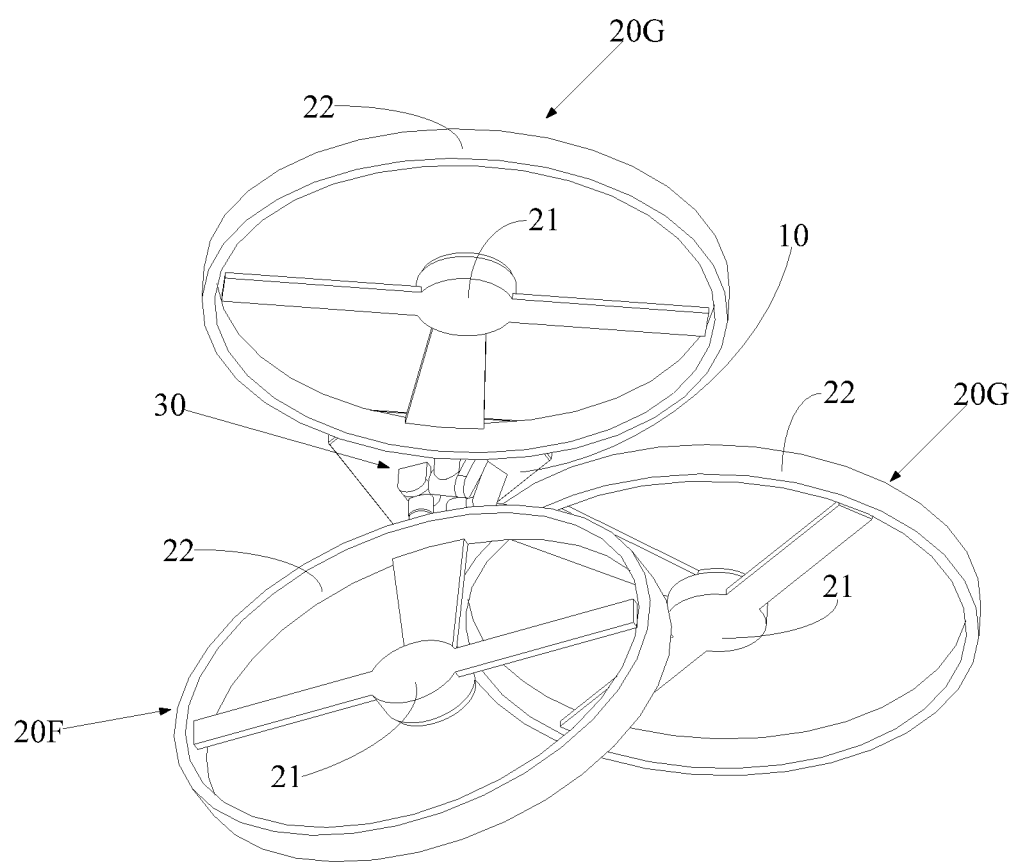
FIG. 14 illustrates another step of the folding process of the trirotor UAV shown in FIG. 10.
Figure 15:
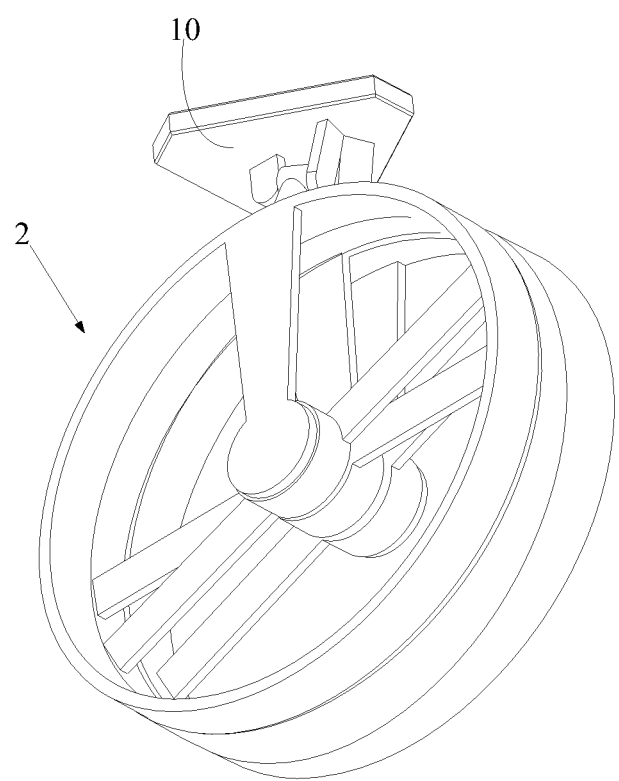
FIG. 15 illustrates another step of the folding process of the trirotor UAV shown in FIG. 10.

When the trirotor UAV is being folded, first, the second connection base 34 of the connection mechanism 30 corresponding to the main rotor mechanism 20F is rotated about the second axial line B with respect to the second rotating shaft 33, thereby driving the main rotor mechanism 20F to be rotated to a position as shown in FIG. 13. Next, the second connection body 36 of the connection mechanism 30 corresponding to the main rotor mechanism 20F is rotated about the third axial line C with respect to the first connection body 35, thereby driving the main rotor mechanism 20F to rotate 90° as shown in FIG. 14. Finally, the second connection base 34 of the connection mechanism 30 corresponding to each of the two auxiliary rotor mechanisms 20G is rotated about the second axial line B with respect to the second rotating shaft 33, thereby driving the two auxiliary rotor mechanisms 20G to rotate and overlap with the main rotor mechanism 20F to form the rotor mechanism assembly 2, and completing the folding of the trirotor UAV, as shown in FIG. 15.

In an embodiment of the present disclosure, the even number of the auxiliary rotor mechanisms constitute a plurality of auxiliary rotor mechanism sets, each auxiliary rotor mechanism set including two auxiliary rotor mechanisms. The two auxiliary rotor mechanisms of each auxiliary rotor mechanism set are symmetrically arranged on two sides of the main rotor mechanism after being rotated with respect to the corresponding connection mechanisms.

In another example provided by the present disclosure, the multi-rotor UAV is a pentarotor UAV having five rotor mechanisms. The axial line of the second rotating shaft of the connection mechanism corresponding to each of the two auxiliary rotor mechanisms of the first auxiliary rotor mechanism set is inclined at a first preconfigured angle with respect to the yaw axis of the multi-rotor UAV. The axial line of the second rotating shaft of the connection mechanism corresponding to each of the two auxiliary rotor mechanisms of the second auxiliary rotor mechanism set is inclined at a second preconfigured angle with respect to the yaw axis of the multi-rotor UAV.

The preconfigured angle formed between the axial line of the second rotating shaft of the connection mechanism corresponding to the main rotor mechanism and the yaw axis of the multi-rotor UAV is 90°. The first preconfigured angle formed between the axial line of the second rotating shaft of the connection mechanism corresponding to each of the two auxiliary rotor mechanisms of the first auxiliary rotor mechanism set and the yaw axis of the multi-rotor UAV is an acute angle. The second preconfigured angle formed between the axial line of the second rotating shaft of the connection mechanism corresponding to each of the two auxiliary rotor mechanisms of the second auxiliary rotor mechanism set and the yaw axis of the multi-rotor UAV is an acute angle. Optionally, the first preconfigured angle may be in the range of 35° to 85°, or/and the second preconfigured angle may be in the range of 35° to 85°.

When the pentarotor UAV is being folded, first, the second connection base of the connection mechanism corresponding to the main rotor mechanism is rotated about the second axial line with respect to the second rotating shaft, thereby driving the main rotor mechanism to rotate. Next, the second connection body of the connection mechanism corresponding to the main rotor mechanism is rotated about the third axial line with respect to the first connection body, thereby driving the main rotor mechanism to rotate 90°. Finally, the second connection base of the connection mechanism corresponding to each of the two auxiliary rotor mechanisms of the plurality of auxiliary rotor mechanism sets are sequentially rotated about the second axial line with respect to the second axial line, thereby driving the two auxiliary rotor mechanisms to rotate and overlap with the main rotor mechanism to form the rotor mechanism assembly, and completing the folding of the pentarotor UAV.

In a third implementation manner, the connection mechanism includes a rotation mechanism disposed on the fuselage. The rotation mechanism is coupled to the rotor mechanism for driving the rotor mechanism to rotate. Optionally, the rotation mechanism may be a universal joint mechanism. That is to say, the rotation mechanism may drive the rotor mechanism to rotate at an arbitrary angle, so that the plurality of rotor mechanisms may be rotated in a preconfigured order and overlap with each other to form a rotor mechanism assembly.

In the third implementation, the multi-rotor UAV provided by the present disclosure includes a fuselage and a plurality of rotor mechanisms disposed on the fuselage. Each of the rotor mechanisms includes a rotor. The multi-rotor UAV further includes a plurality of connection mechanisms disposed on the fuselage. The number of the connection mechanisms is the same as the number of the rotor mechanisms. The plurality of connection mechanisms have a one-to-one correspondence with the plurality of rotor mechanisms, each connection mechanism corresponding to a rotor mechanism. Each of the connection mechanisms includes a rotation mechanism disposed on the fuselage. Correspondingly, the number of the rotation mechanisms is the same as the number of the rotor mechanisms. Each rotor mechanism is movably coupled to the fuselage through its corresponding rotation mechanism. The plurality of rotor mechanisms are driven by their corresponding rotation mechanisms to rotate, and to overlap with each other to form a rotor mechanism assembly.

In summary, the multi-rotor UAV provided by the present disclosure movably connects each rotor mechanism to the fuselage through a corresponding connection mechanism, so that after the plurality of rotor mechanisms are rotated with respect to the corresponding connection mechanisms, the rotor mechanisms can be overlapped with each other to form a rotor mechanism assembly. The multi-rotor UAV can be folded to be portable, and the plurality of rotor mechanisms overlap with each other to form a rotor mechanism assembly, which greatly reduces the volume of the multi-rotor UAV after being folded.

It should be noted that, in the present disclosure, relational terms such as "first" and "second" are used merely to distinguish one entity or operation from another entity or operation, and do not necessarily require or imply actual relationship or order between these entities or operations. The terms "comprise", "include", or any other variations intended to cover a non-exclusive inclusion, such that a process, method, article, or device that having a plurality of elements, include not only those elements but also other items not specifically listed elements, or elements that are inherent to such a process, method, item, or device. Unless otherwise limited, an element that is defined by the phrase "comprising a . . . " does not exclude the presence of additional equivalent elements in the process, method, item, or device that comprises the element.

The method and apparatus provided by the present disclosure according to the embodiments are described in detail above. The principles and implementation manners provided by the present disclosure are described herein by using specific examples. The description of the above embodiments is only used to help understand the method provided by the present disclosure. At the same time, a person skilled in the art will make changes the specific embodiments and the application scope according to the idea provided by the present disclosure. In summary, the contents of the present specification should not be construed as limiting the present disclosure.

The present disclosure contains material that is subject to copyright protection. The copyright is the property of the copyright holder. The copyright holder has no objection to the reproduction of patent documents or patent disclosure in the official records and files of the Patent and Trademark Office.

What is claimed is:
1. A multi-rotor unmanned aerial vehicle (UAV), comprising:
  a fuselage;
  a plurality of rotor mechanisms disposed on the fuselage, each rotor mechanism including a rotor; and
  a plurality of connection mechanisms disposed on the fuselage, the plurality of connection mechanisms having a one-to-one correspondence with the plurality of rotor mechanisms, each connection mechanism corresponding to one of the plurality of rotor mechanisms;

wherein: each rotor mechanism is movably connected to the fuselage through the corresponding connection mechanism; and the plurality of rotor mechanisms are configured to be rotated with respect to the corresponding connection mechanisms to cause the plurality of rotor mechanisms to overlap with each other in a direction perpendicular to a yaw axis of the UAV and form a rotor mechanism assembly.

2. The multi-rotor UAV according to claim 1, wherein for each connection mechanism:
the connection mechanism includes a first connection assembly movably coupled to the fuselage;
the first connection assembly is connected to the corresponding rotor mechanism and configured to be rotated about a first axial line of the first connection assembly; and
the first axial line is inclined at a preconfigured angle from the yaw axis of the multi-rotor UAV.

3. The multi-rotor UAV according to claim 2, wherein for each connection mechanism:
the first connection assembly includes a first rotating shaft connected to the fuselage along the first axial line and a first connection base pivotally connected to the first rotating shaft and coupled to the corresponding rotor mechanism.

4. The multi-rotor UAV according to claim 2, wherein:
the plurality of rotor mechanisms are an even number of rotor mechanisms.

5. The multi-rotor UAV according to claim 4, wherein:
the even number of rotor mechanisms constitute a plurality of rotor mechanism sets, each rotor mechanism set including two of the plurality of rotor mechanisms; and
for each rotor mechanism set, after the two rotor mechanisms of the rotor mechanism set are rotated with respect to their corresponding connection mechanisms, the two rotor mechanisms are symmetrically arranged on two sides of the fuselage.

6. The multi-rotor UAV according to claim 5, wherein:
the multi-rotor UAV is a hexrotor UAV having six rotor mechanisms constituting a first rotor mechanism set, a second rotor mechanism set, and a third rotor mechanism set;
for each of the two rotor mechanisms in the first rotor mechanism set, the first axial line of the corresponding connection forms a 90° angle with the yaw axis of the multi-rotor UAV; and
for each of the four rotor mechanisms in the second and third rotor mechanism sets, the first axial line of the corresponding connection mechanism forms an acute angle with the yaw axis of the multi-rotor UAV.

7. The multi-rotor UAV according to claim 6, wherein the acute angle is in the range of 35° to 85°.

8. The multi-rotor UAV according to claim 1, wherein for each connection mechanism:
the connection mechanism includes a second connection assembly movably coupled to the fuselage and a third connection assembly movably coupled to the second connection assembly;
the second connection assembly is configured to be rotated about a second axial line, the second axial line being inclined at an angle from the yaw axis of the multi-rotor UAV; and the third connection assembly is connected to the rotor mechanism corresponding to the connection mechanism and is configured to be rotated about a third axial line.

9. The multi-rotor UAV according to claim 8, wherein for each connection mechanism:
the second connection assembly includes a second rotating shaft fixed to the fuselage along the second axial line and a second connection base pivotally connected to the second rotating shaft;
the third connection assembly includes a first connection body fixed to the second connection base and a second connection body movably connected to the first connection body along the third axial line; and
the second connection body is connected to the rotor mechanism and configured to be rotated with respect to the first connection body about the third axial line.

10. The multi-rotor UAV according to claim 8, wherein the second axial line is perpendicular to the third axial line.

11. The multi-rotor UAV according to claim 10, wherein:
the plurality of rotor mechanisms are an odd number of rotor mechanisms;
the odd number of rotor mechanisms include a main rotor mechanism and an even number of auxiliary rotor mechanisms; and
the main rotor mechanism and the auxiliary rotor mechanisms are configured to be rotated with respect to their corresponding connection mechanisms to form a rotor mechanism assembly.

12. The multi-rotor UAV according to claim 11, wherein:
after the even number of auxiliary rotor mechanisms are rotated with respect to their corresponding connection mechanisms, they are symmetrically arranged on two sides of the main rotor mechanism, and form the rotor mechanism assembly with the main rotor mechanism.

13. The multi-rotor UAV according to claim 12, wherein:
the multi-rotor UAV is a trirotor UAV having three rotor mechanisms;
for the main rotor mechanism, the second axial line of the corresponding connection mechanism forms a 90° angle with the yaw axis of the multi-rotor UAV; and
for each of the two auxiliary rotor mechanisms, the second axial line of the corresponding connection mechanism forms an acute angle with the yaw axis of the multi-rotor UAV.

14. The multi-rotor UAV according to claim 11, wherein:
the even number of auxiliary rotor mechanisms constitute a plurality of auxiliary rotor mechanism sets, each auxiliary rotor mechanism set including two of the plurality of auxiliary rotor mechanisms; and
for each auxiliary rotor mechanism set, the two auxiliary rotor mechanisms are symmetrically arranged on two sides of the main rotor mechanism after being rotated with respect to their corresponding connection mechanisms.

15. The multi-rotor UAV according to claim 14, wherein:
the multi-rotor UAV is a pentarotor UAV having five rotor mechanisms, the five rotor mechanisms constituting the main rotor mechanism, a first auxiliary rotor mechanism set having two of the auxiliary rotor mechanisms, and a second auxiliary rotor mechanism set having another two of the auxiliary rotor mechanisms;
for each of the two auxiliary rotor mechanisms in the first auxiliary rotor mechanism set, the second axial line of the corresponding connection mechanism is inclined at a first acute angle with respect to the yaw axis of the multi-rotor UAV;

for each of the two auxiliary rotor mechanisms in the second auxiliary rotor mechanism set, the second axial line of the corresponding connection mechanism is inclined at a second acute angle with respect to the yaw axis of the multi-rotor UAV; and for the main rotor mechanism, the second axial line of the corresponding connection mechanism forms a 90° angle with the yaw axis of the multi-rotor UAV.

16. The multi-rotor UAV according to claim 15, wherein:
the first acute angle is in the range of 35° to 85°; and
the second acute angle is in the range of 35° to 85°.

17. The multi-rotor UAV according to claim 1, wherein: each connection mechanism comprises a rotation mechanism disposed on the fuselage, the rotation mechanism being coupled to the corresponding rotor mechanism for driving the rotor mechanism to rotate.

18. The multi-rotor UAV according to claim 1, wherein the plurality of rotor mechanisms are configured to be overlapped with each other to form a concentric rotor mechanism assembly.

19. The multi-rotor UAV according to claim 1, wherein:
each rotor mechanism further includes a protective cover disposed outside the rotor; and
the plurality of rotor mechanisms are configured to be overlapped with each other to form a concentric rotor mechanism assembly.

20. The multi-rotor UAV according to claim 1, wherein at least one of the plurality of connection mechanisms includes a first connection assembly connected to the corresponding rotor mechanism and configured to be rotated about a first axial line of the first connection assembly to cause the corresponding rotor mechanism to be rotated about the first axial line, the first axial line forming an acute angle with the yaw axis of the mull rotor UAV.

21. A multi-rotor unmanned aerial vehicle (UAV), comprising:
a fuselage;
a plurality of rotor mechanisms disposed on the fuselage, each rotor mechanism including a rotor; and
a plurality of connection mechanisms disposed on the fuselage, the plurality of connection mechanisms having a one-to-one correspondence with the plurality of rotor mechanisms, each connection mechanism corresponding to one of the plurality of rotor mechanisms;
wherein:
each rotor mechanism is movably connected to the fuselage through the corresponding connection mechanism;
the plurality of connection mechanisms are not coaxial; and
the plurality of rotor mechanisms are configured to be rotated with respect to the corresponding connection mechanisms to cause the plurality of rotor mechanisms to overlap with each other in a direction perpendicular to a yaw axis of the UAV and form a rotor mechanism assembly.

* * * * *